Patented Mar. 11, 1941

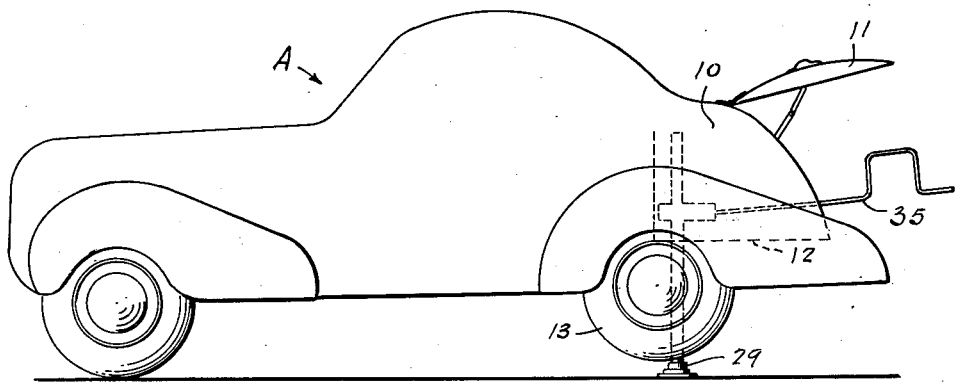
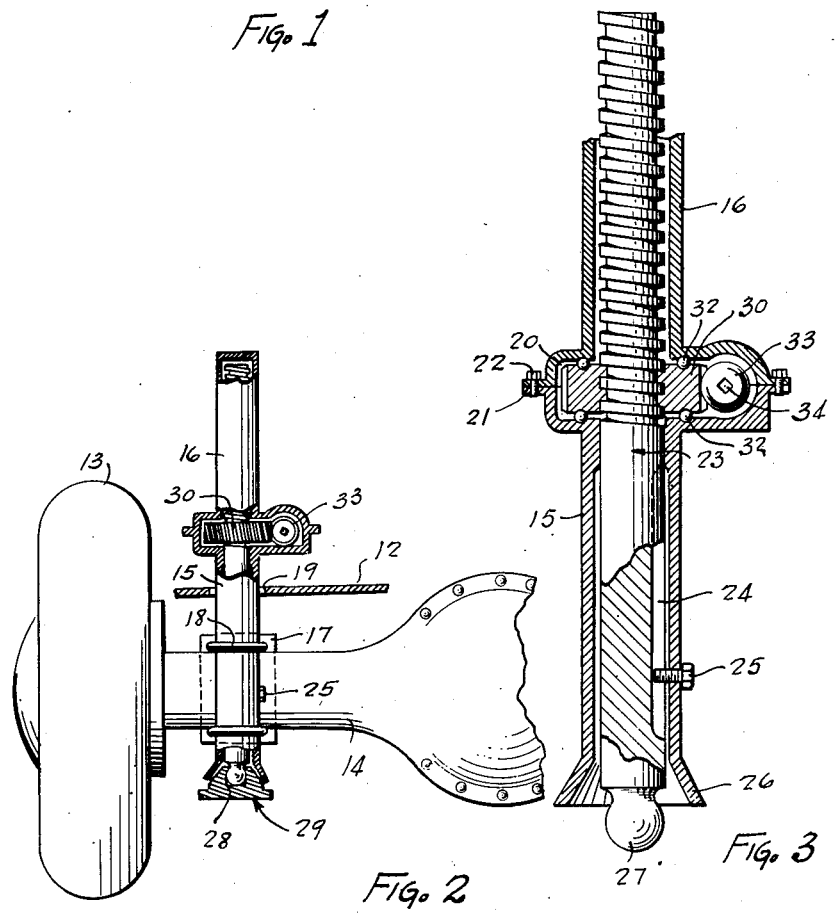

2,234,220

UNITED STATES PATENT OFFICE 2,234,220

AUTOMOBILE JACK

Silvio Antonietti, Philadelphia, Pa.

Application May 15, 1940, Serial No. 335,263

6 Claims. (Cl. 254—86)

This invention relates to automobile jacks such as are employed for raising one wheel of the vehicle and is concerned primarily with a jack that is attached to the vehicle as a permanent fixture.

In the past motorists have experienced considerable difficulty in jacking up a wheel of a car as for the changing of a tire. Attempts have been made to remedy or minimize the difficulty and inconvenience attending the jacking up operation, and in some instances these endeavors have taken the line of providing a jack that is attached to the car as a permanent fixture. However, the known devices of this character have not proven to be entirely satisfactory in that they are either highly complicated or require the motorist to assume an awkward or inconvenient position to operate them.

With these conditions in mind this invention has in view, as its foremost objective, the provision of an automobile jack that is permanently secured to the rear axle housing of the vehicle, is highly simplified in its construction, and which is readily operable from a conveniently accessible position.

In attaining the above noted objective the invention takes cognizance of the fact that an automobile of modern design almost invariably includes a trunk compartment at the rear. With this condition in mind a further detailed object is the provision of an automobile jack of the character above noted which is operable from this trunk compartment.

In carrying out this idea the jack, together with its operating instrumentalities, is attached to the rear axle housing of the vehicle. The floor board of the trunk compartment is formed with an opening through which the upper portion of the jack which carries the operating instrumentalities project. Thus by opening the trunk compartment the operating instrumentalities are rendered accessible for jacking up purposes.

A more particular object in view is the provision of a jack of the character above noted which includes a casing structure, together with means for securely clamping the same to the rear axle housing of a motor vehicle. A screw stem is operatively mounted in said casing structure, and key means provided for preventing relative rotation of said stem with respect to the casing. A screw operating member that carries on its exterior a worm gear is operatively associated with said stem and is carried by the casing structure in a position above the floor board of the trunk compartment. A worm meshes with this worm gear and is provided with a socket which is adapted to receive an operating member such as a conventional jack handle of the crank type.

Another somewhat more detailed object of the invention is the provision of a jack of the character above noted which includes a ground engaging member in the form of a pedestal which is attached to the screw stem by a universal joint.

Various other more detailed objects and advantages such as arise in connection with the attainment of the above noted objectives will in part become apparent, and in part be hereinafter stated, as the description of the invention proceeds.

The invention, therefore, comprises an automobile jack which is intended to be permanently affixed to the rear axle housing of a motor vehicle. The jack consists of a casing structure, together with means for securely clamping the same to the rear axle housing. The casing structure houses a screw stem, and a screw operating member meshes with the latter and is carried by the casing structure above the floor board of the trunk compartment. This operating member is formed on its exterior with a worm gear, and meshing therewith is a worm which is provided with a socket for engagement by an operating handle of the crank type. At the lower end the screw stem carries a ground engaging pedestal that is connected therewith by a universal joint.

For a full and more complete understanding of the invention reference may be had to the following description and accompanying drawing, wherein Figure 1 is a diagrammatic representation of a motor vehicle to which a jack has been attached in accordance with the precepts of this invention, Figure 2 is a fragmentary view from the rear, partly in section and partly in elevation, bringing out the manner in which the jack is attached to the rear axle housing and the relation thereof to the floor board of the trunk compartment, and Figure 3 is an enlarged detailed sectional view through the jack per se.

Referring now to the drawing, wherein like reference characters denote corresponding parts, there is represented diagrammatically in Figure 1 a motor vehicle which is referred to in its entirety by the reference character A. The vehicle A includes, at the rear, a trunk compartment designated 10, and with which is associated the usual door 11. This trunk compartment 10 also includes a floor board (dotted lines, Figure 1) such as shown at 12 in Figure 2. The vehicle A also includes a pair of rear wheels each of which is identified as 13. These rear wheels 13 are mounted in the usual manner on an axle that is contained within the rear axle housing designated 14.

In accordance with this invention a pair of jacks will be mounted on the rear axle housing 14, there being a jack adjacent to each of the rear wheels 13. Inasmuch as such jacks will be substantial duplicates, only one of them is illustrated in the drawing and here described.

The jack mechanism comprises a casing structure made up of a lower casing part 15 and an upper casing part 16. The lower casing part 15 may be securely clamped to the rear axle housing 14 in any preferred manner such as by the securing means comprising a plate 17 that is disposed on one side of the axle housing 14 opposite to the casing part 15. Yokes 18 extend about the casing part 15 and have their ends anchored to the plate 17. This lower casing part 15 extends an appreciable distance above the rear axle housing 14, through an opening 19 formed in the floor board 12.

At its upper end the lower casing part 15 carries wall structure that is complemental to and cooperates with similar wall structure on the upper casing part 16 to define a chamber represented at 20. The purpose of this chamber 20 will be later pointed out in detail, and it is noted that the structure which defines this chamber includes flanges 21 on the parts 15 and 16, respectively, through which pass fastening elements 22 that maintain the assembled relation of the casing parts 15 and 16.

The casing parts 15 and 16 are, with the exception of the chamber structure 20, of a sleeve-like cylindrical formation which houses a screw stem 23. That portion of the stem 23 which extends through the lower casing part 15 is formed with a keyway 24 into which projects a key 25 carried by the lower casing part 15. Thus while the screw stem 23 may move vertically with respect to the casing structure, any relative rotation with respect thereto is precluded by the reception of the key 25 in the keyway 24.

At the lower end the casing structure 15 is flared outwardly, as represented at 26, to accommodate and protect the connection of a pedestal with the screw stem 23. The lower end of the member 23 preferably takes the form of a ball 27 which is received in a socket 28 that is formed in a pedestal 29. This pedestal 29 preferably has a conical formation about the socket 28 that is substantially complemental to the flared structure 26, and this conical formation is received within the flare when the jack is in its retracted or ineffective position.

An operating screw member is shown at 30 and carries interior threads which are in threaded engagement with the threads of the screw stem 23. This member 30 carries, on its outer periphery, worm teeth represented at 31. It is notable that the member 30 is mounted in the chamber 20 and that appropriate bearings, such as represented at 32, are interposed between this member and the respective horizontal walls of the casing parts 15 and 16.

Meshing with the worm gear teeth 31 is a worm 33 that is also operatively mounted in the wall structure defining the chamber 20. This worm 33 presents a wrench engaging socket at 34 that is adapted to receive a complementally shaped extremity on the end of a jack handle 35 of the crank type.

It is evident that under normal conditions the pedestal 29 is maintained in the upraised position represented in Figure 2. When it becomes desirable to jack up one of the wheels 13 the door 11 of the trunk compartment 10 is opened, as depicted in Figure 1. The end of the crank handle 35 is then inserted in the socket 34 in the manner represented in Figure 1, and this crank handle is rotated. This causes a corresponding rotation of the worm 33, which in turn rotates the member 30 to lower the screw stem 23. Thus the pedestal 29 is brought into engagement with the ground and the vehicle raised.

It is notable that the floor board 12 will be spaced a sufficient distance beneath the structure defining the chamber 20 so as not to interfere with movement of this floor board with respect to the rear axle housing which is provided for by the springs of the vehicle.

While a preferred specific embodiment of the invention is hereinbefore set forth it is to be clearly understood that the invention is not to be limited to the exact construction illustrated and described, because various modifications of these details may be provided in putting the invention into practice within the purview of the appended claims.

I claim:

1. In combination, a motor vehicle including a rear axle housing and a floor board disposed thereabove and having an opening therein, and a jack attached to said rear axle housing and extending vertically upwardly through said opening, said jack including operating instrumentalities disposed above said floor board over said opening.

2. In combination, a motor vehicle including a rear axle housing and a trunk compartment the bottom of which is defined by a floor board formed with an opening above said rear axle housing, and a jack permanently secured to said rear axle housing and extending through said opening, said jack including operating instrumentalities disposed above said floor board in said trunk compartment.

3. In combination, a motor vehicle including a rear axle housing and a trunk compartment the bottom of which is defined by a floor board having an opening above said rear axle housing, and a jack comprising a casing, means for securing said casing to said rear axle housing, a screw stem in said casing, said casing and screw stem projecting through said opening above said floor board, and operating instrumentalities associated with said screw stem, carried by said casing and disposed above said floor board.

4. In combination, a motor vehicle including a rear axle housing and a trunk compartment the bottom of which is defined by a floor board having an opening above said rear axle housing, and a jack comprising a sleeve-like casing, means securing said casing to said rear axle housing extending through said opening and including wall structure presenting a chamber above said floor board, a screw stem in said casing, a worm gear in said chamber in threaded engagement with the said screw stem, and a worm meshing with said worm gear, said worm being provided with handle engaging means.

5. In combination, a motor vehicle including a rear axle housing and a trunk compartment the bottom of which is defined by a floor board having an opening above said rear axle housing, and a jack comprising a sleeve-like casing, means securing said casing to said rear axle housing extending through said opening and including wall structure presenting a chamber above said floor board, a screw stem in said casing, a pedestal carried by the lower end of said stem and connected thereto by a universal joint, and screw means in said chamber for causing reciprocation of said screw stem in said casing.

6. In combination, a motor vehicle including a rear axle housing and a trunk compartment the bottom of which is defined by a floor board having an opening above said rear axle housing, and a jack comprising a sleeve-like casing, means securing said casing to said rear axle housing extending through said opening and including wall structure presenting a chamber above said floor board, a screw stem in said casing, key means for preventing relative rotation of said screw stem with respect to said casing, a pedestal carried at the lower end of said casing and connected thereto by a universal joint, a worm gear in said chamber in threaded engagement with said screw stem, and a worm meshing with said worm gear, said worm being provided with crank handle engaging means.

SILVIO ANTONIETTI.